(No Model.)
L. H. GIRAUD.
BUILDING CELL.
No. 486,284. Patented Nov. 15, 1892.
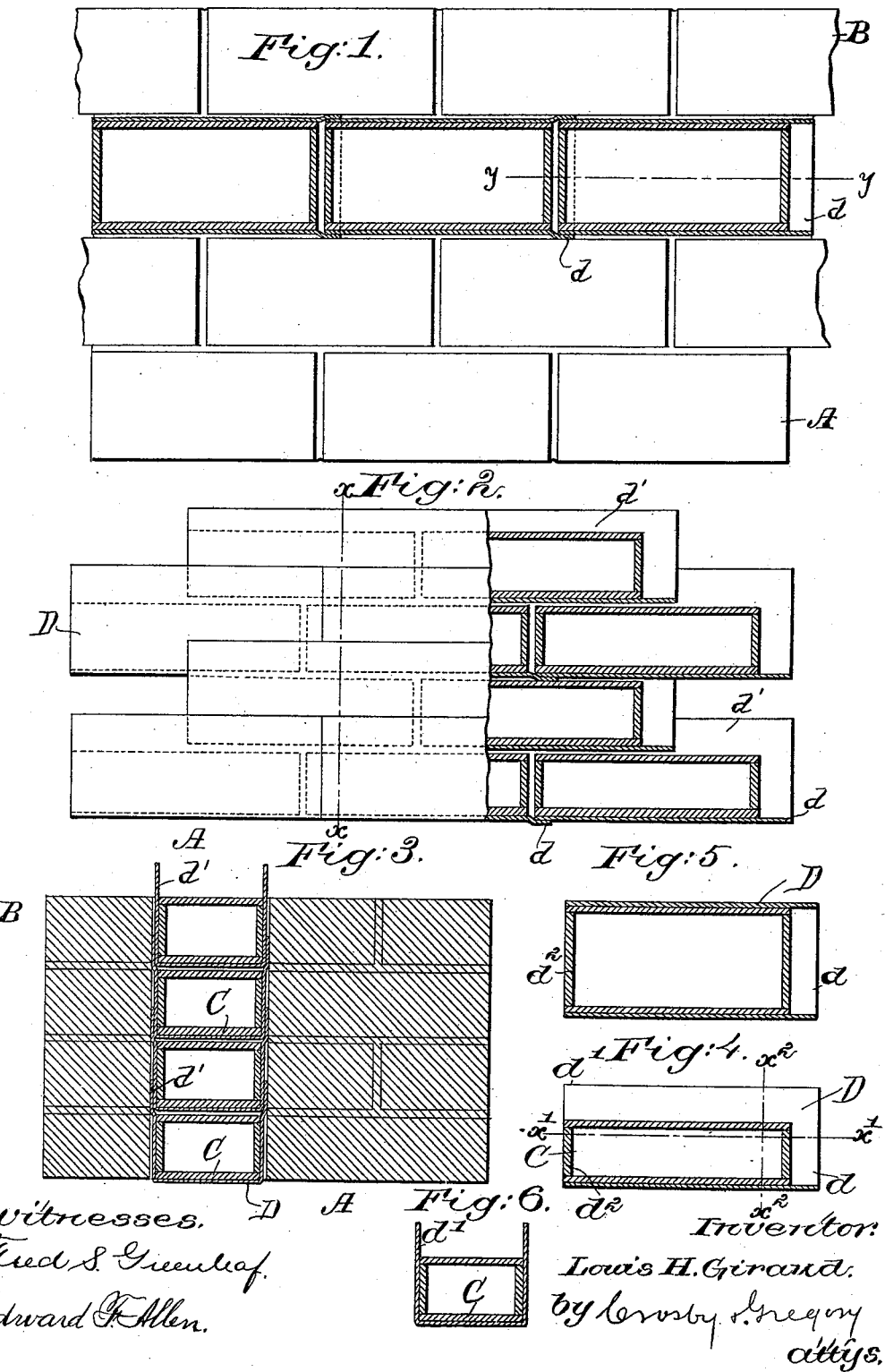
Witnesses.
Fred S. Greenleaf.
Edward F. Allen.
Inventor:
Louis H. Giraud.
by Crosby & Gregory
attys.

UNITED STATES PATENT OFFICE.

LOUIS H. GIRAUD, OF BOSTON, MASSACHUSETTS.

BUILDING-CELL.

SPECIFICATION forming part of Letters Patent No. 486,284, dated November 15, 1892.

Application filed February 4, 1892. Serial No. 420,291. (No model.)

*To all whom it may concern:*

Be it known that I, LOUIS H. GIRAUD, of Boston, county of Suffolk, State of Massachusetts, have invented an Improvement in Building-Cells, of which the following description, in connection with the accompanying drawings, is a specification, like letters on the drawings representing like parts.

This invention has for its object to improve and simplify the construction of walls, floors, partitions, &c., with which it is desired to prevent the radiation of heat or cold, and in connection with which it is desired that the passage of sound may be deadened.

In accordance with my invention I take a series of boxes of rectangular or other suitable shape, and of wood or other suitable material, and when preferably closed tight, so as to entrap air, I dip or otherwise coat the boxes, preferably of about the size of usual bricks, with some suitable substance containing, preferably, a pitch, tar or other suitable gum or resin to make the box water-repellent, and also to preferably add to its greater life and durability. These blocks are then laid into a wall, and by the term "wall" I mean any building construction, either walls or floors. These boxes are preferably laid in the space between rows of bricks; but they may be laid inside the wall or next the wall composed of any usual material at any desired part thereof. In laying these boxes into a wall, floor, or ceiling of whatever form I employ in connection with them a strong paper or other sheet, preferably coated with some tarry, pitchy, or resinous substance to make the same waterproof or water-repellent. The sheet used is longer than the boxes and preferably wider than the sum of the bottom and sides of the box, so that when the sheet is doubled up upon the sides of the boxes they will come above the top or cover of the boxes and overlap the lower part of a superimposed box, also inclosed in a like sheet, the projecting ends of the sheet serving as connections across the joints between the abutting ends of the boxes.

Referring to the drawings, Figure 1 represents a top or plan view of a wall shown as composed of brick with which I have seen fit to embody my invention, my improved boxes being shown therein in horizontal section. Fig. 2 is a section on the line $y\,y$, Fig. 1, some of the boxes and the sheet or jacket outside them being broken out. Fig 3 is a cross-section on the line $x$, Fig. 2. Fig. 4 is a longitudinal vertical section of one of my improved boxes in connection with its inclosing sheet or binding-jacket. Fig. 5 is a section of Fig. 4 on the line $x'$, and Fig. 6 is a section of Fig. 4 on the line $x^2$.

In the drawings, A B represent a series of bricks, which may be of any usual or suitable shape or material.

My improved box C when used in connection with a brick wall will preferably be about the size of the bricks used, and these boxes may be interposed as a barrier against the passage of heat or cold or sound in any portion of the wall.

By the term "wall" I mean to include any side wall, ceiling, or floor of any room or apartment, wherein it is desired to prevent the passage of heat and cold through the walls, or sound therethrough.

The boxes C, preferably of wood, but which may be of any other suitable light and cheap material, will be firmly united in the desired shape and will then be coated by immersion or otherwise with some suitable tarry, pitchy, resinous or gummy material substantially water repellent or waterproof, said boxes containing air and constituting dead-air chambers. In connection with these boxes I employ a uniting-sheet D, which in length is longer than the box, so as to leave a projecting lip $d$, see Figs. 1, 2, 4, and 5, and the uniting sheet or jacket will also be broader than the distance across the bottom of the box added to its vertical sides so as to leave upright flanges or lips $d'$.

As represented in this present embodiment of my invention, the space between the bricks A and B is filled with my air-tight boxes, and in laying the said boxes it will be seen that that end $d^2$ of a box where the lip $d$ is omitted will be laid upon the lip $d$ of a box against which it is abutted, as represented best in Figs. 1 and 2. The lip $d$ serves as a binder or connection across the joints between the abutting ends of the boxes, and in laying the boxes they will preferably be laid to leave joints as commonly practiced in laying bricks. The lips $d'$, projected above the top of a box, receive between them the base of a box already inclosed in like manner in a sheet or jacket, as best represented in Figs. 2 and 3, the said lips, besides aiding in keeping the boxes in proper position, also serving to close any spaces or joints between the top of one and the bottom of another box.

I am aware that walls in building construction have been provided with air-chambers in various ways; but I am not aware that boxes or air-chambers have ever been put together in a wall and that the joints between their tops and bottoms and abutting ends have been overlapped or guarded against the passage of heat, cold, or sound by a sheet or jacket as stated.

In practice the boxes referred to will preferably be set upon the sheets or jackets D while the latter are yet tacky, so as to cause the sheets or jackets to adhere to the boxes, and the boxes with their attached sheets will be sold as articles of manufacture to go into building construction wherever deadened walls or walls to resist the passage of heat and cold are desired.

Having described my invention, what I claim, and desire to secure by Letters Patent, is—

1. As an improved article of manufacture, a closed hollow box or air-tight cell, combined with an attached jacket or sheet having a binder-lip $d$ extended from one to the other side of one end of the box, substantially as described.

2. A closed box or air-tight cell, combined with a sheet or jacket attached to the bottom thereof and having its opposite sides projected above the top of the box to form binder-lips $d'$, substantially as described.

3. A box or air-tight cell having a coating or covering, substantially as described, to make it water-repellent, combined with a water-repellent sheet or jacket applied to the bottom thereof and adapted to extend at each side above the top of and beyond, also, the end of the box or air-cell and leave lips to cooperate with the abutting end of other boxes or air-cells having like sheets or jackets and form a binder across the joints, substantially as described.

In testimony whereof, I have signed my name to this specification in the presence of two subscribing witnesses.

LOUIS H. GIRAUD.

Witnesses:
GEO. W. GREGORY,
FRANCES M. NOBLE.